(12) United States Patent
Feng et al.

(10) Patent No.: US 10,913,247 B2
(45) Date of Patent: Feb. 9, 2021

(54) MULTILAYER SHEET, METHODS FOR MAKING AND USING THE SAME, AND ARTICLES COMPRISING THE MULTILAYER SHEET

(71) Applicant: SABIC GLOBAL TECHNOLOGIES B.V., Bergen op Zoom (NL)

(72) Inventors: Wei Feng, Shanghai (CN); Geert Boven, Steenbergen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 439 days.

(21) Appl. No.: 15/111,234

(22) PCT Filed: Feb. 19, 2015

(86) PCT No.: PCT/IB2015/051270
§ 371 (c)(1),
(2) Date: Jul. 13, 2016

(87) PCT Pub. No.: WO2015/125102
PCT Pub. Date: Aug. 27, 2015

(65) Prior Publication Data
US 2016/0347040 A1    Dec. 1, 2016

Related U.S. Application Data

(60) Provisional application No. 61/941,699, filed on Feb. 19, 2014.

(51) Int. Cl.
*B32B 27/08*    (2006.01)
*B32B 27/30*    (2006.01)
(Continued)

(52) U.S. Cl.
CPC ............ *B32B 27/08* (2013.01); *B32B 27/308* (2013.01); *B32B 27/365* (2013.01); *C08J 7/042* (2013.01);
(Continued)

(58) Field of Classification Search
CPC ..... B32B 27/08; B32B 27/308; B32B 27/365; B32B 2250/24; B32B 2255/10;
(Continued)

(56) References Cited

U.S. PATENT DOCUMENTS 9,778,398 B2   10/2017   Kang et al.
10,294,387 B2   5/2019   Kang et al.
(Continued)

FOREIGN PATENT DOCUMENTS

EP    2843008 A1    3/2015
JP    2002127286 A    4/2006
(Continued)

OTHER PUBLICATIONS

English Abstract of KR20110037622; Date of Publication: Apr. 13, 2011; 2 Pages.
(Continued)

*Primary Examiner* — Ramsey Zacharia
(74) *Attorney, Agent, or Firm* — Cantor Colburn LLP

(57) ABSTRACT

In an embodiment, a multilayer sheet, comprises: a substrate comprising a cap layer comprising a polymeric material and a core layer, wherein when joined, the cap layer forms a first surface of the substrate and the core layer forms a second surface of the substrate; a first coating layer disposed on the first surface of the substrate, wherein the first coating is a hard coating; and a second coating layer disposed on the second surface of the substrate, wherein the second coating
(Continued)

is a flexible coating; wherein the multilayer sheet passes a ball drop test from a distance of greater than or equal to 50 centimeters.

18 Claims, 1 Drawing Sheet

(51) Int. Cl.
   *C08J 7/04* (2020.01)
   *B32B 27/36* (2006.01)
(52) U.S. Cl.
   CPC ....... *B32B 2250/24* (2013.01); *B32B 2255/10* (2013.01); *B32B 2255/26* (2013.01); *B32B 2307/558* (2013.01); *B32B 2307/584* (2013.01); *B32B 2457/202* (2013.01); *C08J 7/04* (2013.01); *C08J 2333/12* (2013.01); *C08J 2369/00* (2013.01); *C08J 2475/16* (2013.01)
(58) Field of Classification Search
   CPC .......... B32B 2255/26; B32B 2307/558; B32B 2307/548; B32B 2457/202; C08J 7/04; C08J 7/042; C08J 2333/12; C08J 2369/00; C08J 2475/16; C09D 175/14
   See application file for complete search history.

(56) References Cited

U.S. PATENT DOCUMENTS

| | | | |
|---|---|---|---|
| 2006/0286383 A1* | 12/2006 | Gilmer | C08F 222/1006 428/412 |
| 2007/0052670 A1 | 3/2007 | Lee et al. | |
| 2009/0169896 A1 | 7/2009 | Sohn et al. | |
| 2010/0003523 A1* | 1/2010 | Sharygin | B29C 45/14688 428/412 |
| 2012/0010316 A1 | 1/2012 | Meyer et al. | |
| 2012/0194974 A1 | 8/2012 | Weber et al. | |

FOREIGN PATENT DOCUMENTS

| | | |
|---|---|---|
| JP | 2006103169 A | 4/2006 |
| JP | 2007030307 A | 2/2007 |
| JP | 2009279840 A | 12/2009 |
| JP | 2011031527 A | 2/2011 |
| KR | 20110037622 A | 4/2011 |
| WO | 2008047940 A1 | 4/2008 |
| WO | 2010026852 A1 | 3/2010 |
| WO | 2011013798 A1 | 2/2011 |
| WO | 2013180506 A1 | 12/2013 |
| WO | 2013192285 A1 | 12/2013 |

OTHER PUBLICATIONS

International Search Report for International Application No. PCT/IB2015/051270; International Filing Date: Feb. 19, 2015; dated May 22, 2015; 5 Pages.

Written Opinion of the International Searching Authority for International Application No. PCT/IB2015/051270; International Filing Date: Feb. 19, 2015; dated May 22, 2015; 8 Pages.

* cited by examiner

MULTILAYER SHEET, METHODS FOR MAKING AND USING THE SAME, AND ARTICLES COMPRISING THE MULTILAYER SHEET

CROSS REFERENCE TO RELATED APPLICATIONS

This application is a 371 of International Application No. PCT/IB2015/051270, filed Feb. 19, 2015, which claims priority U.S. Patent Application Ser. No. 61/941,699, filed Feb. 19, 2014 which are incorporated herein by reference in their entirety.

TECHNICAL FIELD

Disclosed herein are multilayer sheets, methods for making and using the same, and articles comprising the same.

BACKGROUND

Most portable electronic devices use glass for a portion of the device, internally or externally. Externally, glass can be provided as part of a housing and is generally referred to as a cover window. Glass has transparent and scratch resistant features that make it well suited for such applications. Portable electronic devices typically have various layers that can include a display technology layer, a sensing arrangement, and/or a cover window disposed over the display technology layer. The display technology layer can include a liquid crystal display (LCD) that includes a liquid crystal module (LCM). The LCM is generally an upper glass sheet and a lower glass sheet sandwiching a liquid crystal layer therebetween. The sensing arrangement can be a touch sensing arrangement for touch screens.

The cover window can be made of a polymeric sheet or glass. Polymeric material is durable, but scratches very easily. Glass is scratch resistant, but brittle. The thicker the glass is, the stronger it is, but the glass window is generally thin, and is a weak component of the device. For example, the cover window, when made of glass, can be highly susceptible to damage when the portable electronic device is stressed. Chemical strengthening can be used to strengthen the glass, but adds complexity to the production of the device by adding time and steps to the production process. Utilization of polymeric sheeting for the cover window would be desirable since polymeric material is more lightweight than glass and can be used in applications needing a small thickness without breakage as compared to glass. However polymeric material can have issues with respect to impact and scratch resistance.

Thus, there is a need for cover windows utilizing polymeric sheet material that is lightweight and that can offer durability in terms of impact resistance and scratch resistance.

SUMMARY

Disclosed, in various embodiments, are multilayer sheets, and methods for making and using the same.

In one embodiment, a multilayer sheet, comprises: a substrate comprising a cap layer comprising a polymeric material and a core layer, wherein when joined, the cap layer forms a first surface of the substrate and the core layer forms a second surface of the substrate; a first coating layer disposed on the first surface of the substrate, wherein the first coating is a hard coating; and a second coating layer disposed on the second surface of the substrate, wherein the second coating is a flexible coating; wherein the multilayer sheet passes a ball drop test from a distance of greater than or equal to 50 centimeters.

In an embodiment, a method of making a multilayer sheet comprises: forming a substrate comprising a cap layer comprising a material selected from the group consisting of polymethyl methacrylate, polycarbonate, and combinations comprising at least one of the foregoing, wherein the substrate has a first surface and a second surface; applying a first coating layer on the first surface; and applying a second coating layer on the second surface; wherein the multilayer sheet passes a ball drop test from a distance of greater than or equal to 70 centimeters and wherein the first coating layer has a pencil hardness as measured according to ASTM D3363-05 of greater than or equal to 4H.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
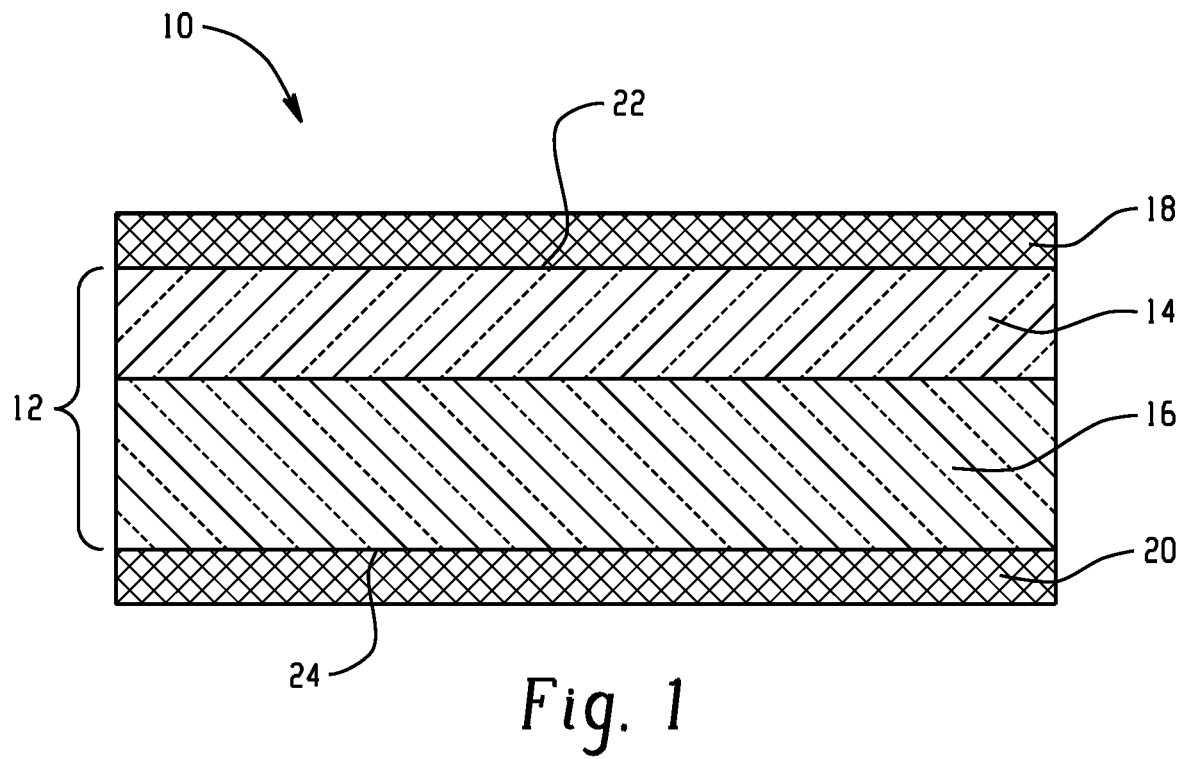
FIG. 1 is a depiction of a multilayer sheet with a substrate comprising a cap layer and a core layer.

Disclosed herein, in various embodiments, are polymeric multilayer sheets comprising a substrate having a first surface and a second surface, a first coating layer disposed on the first surface, and a second coating layer disposed on the second surface. The substrate, first coating layer, and second coating layer, can each comprise a polymeric material. When the first coating layer comprises a relatively hard coating and the second coating layer comprises a relatively flexible coating, the multilayer sheet can pass a ball drop test, wherein a multilayer sheet is considered to pass the ball drop test if no cracks or other visible damage to an unaided eye are present on the multilayer sheet when a ball is dropped onto the multilayer sheet from a distance from greater than 50 centimeters (cm) with a 13.8 gram (g) steel ball. Flexible coating as described herein generally refers to a coating having a Taber Abrasion value of greater than 7%, while hard coating as described herein generally refers to a coating having a Taber Abrasion value of less than or equal to 5%, and intermediate coatings as described herein generally refers to coatings having a Taber Abrasion value between flexible and hard (i.e., greater than 5% to less than or equal to 7%).

The multilayer sheets described herein can advantageously replace the use of glass, in various electronic devices, including, but not limited to, handheld electronic devices (e.g., mobile phones, media players, personal digital assistants, remote controls, etc.); portable computers; tablet computers; displays; monitors; televisions; etc. Polymeric material can offer reduced weight and easy cutting/forming processability properties as compared to glass. The polymeric multilayer sheets disclosed herein can offer high pencil hardness (e.g., a rating of greater than or equal to 4H on a first side of the substrate) as well as high impact behavior (e.g., able to sustain an impact from greater than or equal to 50 cm without cracking).

It is to be understood that the first coating layer (e.g., relatively hard coating) and the second coating layer (e.g., relatively flexible coating) as described herein are different. It can be desirable for the first coating layer to have a pencil hardness of at least 4H, specifically, at least 5H and/or a Taber Abrasion value of less than or equal to 5% and the second coating layer to have a pencil hardness of greater than or equal to B, specifically, greater than or equal to HB and/or a Taber Abrasion value of greater than or equal to 7%. Pencil hardness values as described and reported herein were measured according to ASTM D3363-05 with 1,000 g loading and Taber Abrasion values as described and reported herein were measured according to ASTM D1044-05 with CS-10F wheels, 500 g weight and 100 cycles. Hard coatings cannot, by themselves, provide high pencil hardness and acceptable ball drop performance, simultaneously. The same holds true with respect to flexible coatings. Multilayer sheets with either two hard coatings or two flexible coatings either have acceptable ball drop performance with low pencil hardness or poor ball drop performance with high pencil hardness. It was unexpectedly discovered that a multilayer sheet using a hard coating on a first surface (e.g., top surface) of a substrate and a flexible coating on a second surface (e.g., bottom surface) of a substrate can provide both high pencil hardness on the side of the substrate having the hard coating (i.e., first surface) and good ball drop performance to the multilayer sheet. As referred to herein, acceptable ball drop performance generally refers to the ability of the multilayer sheet or article made therefrom to be able to withstand a ball dropped onto the sheet or article from a distance of greater than or equal to 50 cm, specifically, greater than or equal to 60 cm, more specifically, greater than or equal to 70 cm, even more specifically, greater than or equal to 80 cm, still more specifically, greater than or equal to 90 cm, and even more specifically still, greater than or equal to 100 cm, without cracking visible to the unaided eye.

It can also be desirable for the multilayer sheets disclosed herein to have acceptable weathering performance such that a change in the yellowness index (delta YI) of the multilayer sheet after exposure to ultraviolet light is less than or equal to 4. Yellowness index as described herein was measured according to ASTM E313-10, weathering is defined as exposure to UVB radiation at an intensity of 0.55 Watts per square meter ($W/m^2$) at 313 nanometers (nm) for 72 hours (h) at 60° C.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 illustrates a multilayer sheet 10 comprising a substrate 12 comprising a cap layer 14 and a core layer 16. The substrate 12 can have a first surface 22 and a second surface 24, where the first surface 22 is located on the cap layer 14 and the second surface 24 is located on the core layer 16. The cap layer 14 and the core layer 16 can optionally be co-extruded with one another. As illustrated in FIG. 1, a first coating layer 18 can be disposed upon and in intimate contact (e.g., physical contact) with the first surface 22 of the substrate 12 and a second coating layer 20 can be disposed upon and in intimate contact with (e.g., physical contact) with the second surface 24 of the substrate 12.

Figure 2:
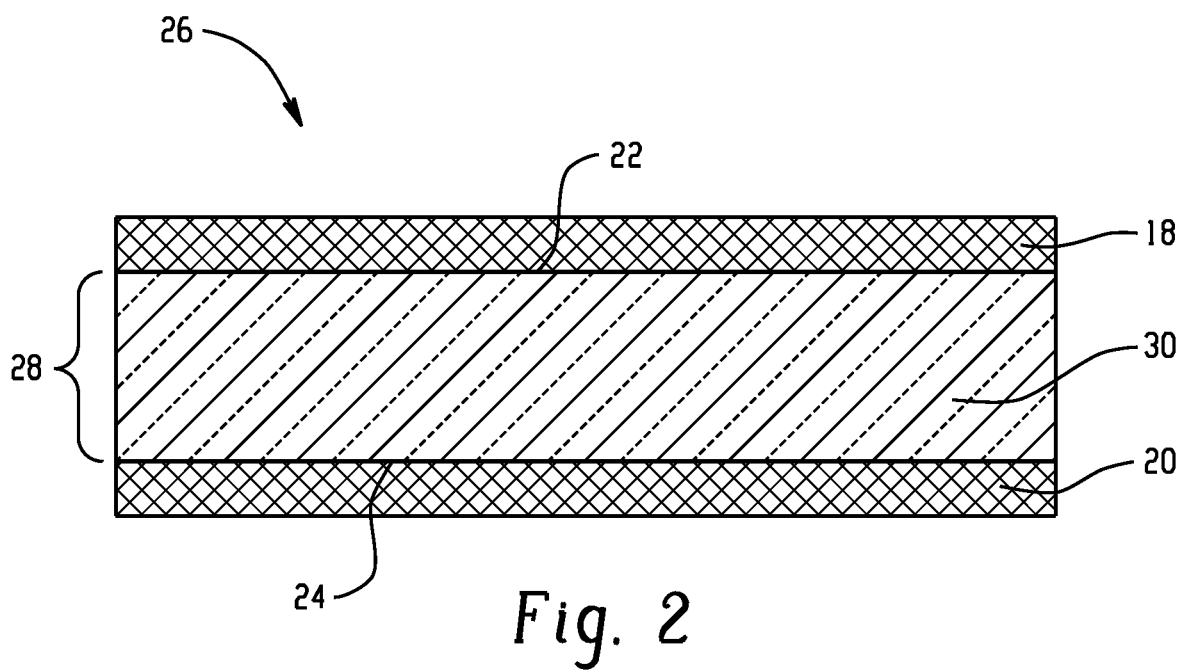
FIG. 2 is a depiction of a multilayer sheet with a substrate comprising a core layer.

FIG. 2 illustrates another multilayer sheet 26 wherein the multilayer sheet 26 comprises a substrate 28 located between a first coating layer 18 and a second coating layer 20 where the substrate 28 can have a first surface 22 and a second surface 24. As illustrated in FIG. 2, the first coating layer 18 can be disposed across the first surface 22 of the substrate 28 and the second coating layer 20 can be disposed across the second surface 24 of the substrate 28. In FIG. 1 and FIG. 2, the first coating layer 18 and/or the second coating layer 20 can be disposed across the surface of the substrate 12, 28. The first coating layer 18 can comprise a hard coating, while the second coating layer 20 can comprise a flexible coating.

The substrate can comprise a transparent material, such as polymeric resins, thermosets, and combinations comprising at least one of the foregoing. Possible polymeric resins that may be employed in formation of the substrate include, but are not limited to, oligomers, polymers, ionomers, dendrimers, copolymers such as graft copolymers, block copolymers (e.g., star block copolymers, random copolymers, etc.) and combinations comprising at least one of the foregoing. Examples of such polymeric resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates), polyesters (e.g., copolyesters, polythioesters), polyolefins (e.g., polypropylenes and polyethylenes, high density polyethylenes, low density polyethylenes, linear low density polyethylenes), polyamides (e.g., polyamideimides), polyarylates, polysulfones (e.g., polyarylsulfones, polysulfonamides), polyphenylene sulfides, polytetrafluoroethylenes, polyethers (e.g., polyether ketones, polyether etherketones, polyethersulfones), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazzanes, polysiloxanes, and combinations comprising at least one of the foregoing.

More particularly, the polymeric material used in the substrate composition can include, but is not limited to, polycarbonate resins (e.g., LEXAN™ resins, commercially available from SABIC's Innovative Plastics business), polyetherimide resins (e.g., ULTEM™ resins, commercially available from SABIC's Innovative Plastics business), copolyestercarbonate resins (e.g. LEXAN™ SLX resins, commercially available from SABIC's Innovative Plastics business), and combinations comprising at least one of the foregoing resins. Even more particularly, the polymeric resins can include, but are not limited to, homopolymers and copolymers of a polycarbonate, a polyester, a polyacrylate (e.g., polymethyl methacrylate (PMMA), a polyamide, a polyetherimide, or a combination comprising at least one of the foregoing resins. The polycarbonate can comprise copolymers of polycarbonate (e.g., polycarbonate-polysiloxane, such as polycarbonate-polysiloxane block copolymer, polycarbonate-dimethyl bisphenol cyclohexane (DMBPC) polycarbonate copolymer (e.g., LEXAN DMX™ resins commercially available from SABIC's Innovative Plastics business), linear polycarbonate, branched polycarbonate, end-capped polycarbonate (e.g., nitrile end-capped polycarbonate), and combinations comprising at least one of the foregoing, for example a combination of branched and linear polycarbonate.

For example, the substrate of the multilayer sheet can comprise polycarbonate and/or PMMA, and/or can comprise a cap layer comprising PMMA and a co-extruded core layer comprising polycarbonate, and/or can comprise a cap layer comprising DMBPC polycarbonate (i.e., BPA PC/DMBPC PC) and a co-extruded core layer comprising polycarbonate.

As used herein, the term "polycarbonate" means compositions having repeating structural carbonate units of formula (1)

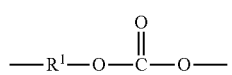

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

HO-A$^1$-Y$^1$-A$^2$-OH    (2)

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (3)

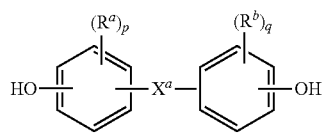

(3)

wherein $R^a$ and $R^b$ each represent a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (3), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q are each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C(R$^c$)(R$^d$)— wherein R$^c$ and R$^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=R$^e$)— wherein R$^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

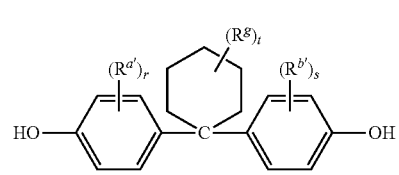

(4)

wherein R$^{a'}$ and R$^{b'}$ are each independently $C_{1-12}$ alkyl, R$^g$ is $C_{1-12}$ alkyl or halogen, r and s are each independently 1 to 4, and t is 0 to 10. In a specific embodiment, at least one of each of R$^{a'}$ and R$^{b'}$ are disposed meta to the cyclohexylidene bridging group. The substituents R$^{a'}$, R$^{b'}$, and R$^g$ can, when comprising an appropriate number of carbon atoms, be straight chain, cyclic, bicyclic, branched, saturated, or unsaturated. In an embodiment, R$^{a'}$ and R$^{b'}$ are each independently $C_{1-4}$ alkyl, R$^g$ is $C_{1-4}$ alkyl, r and s are each 1, and t is 0 to 5. In another specific embodiment, R$^{a'}$, R$^{b'}$ and R$^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ is a $C_{1-18}$ alkylene group, a $C_{3-18}$ cycloalkylene group, a fused $C_{6-18}$ cycloalkylene group, or a group of the formula —B$^1$—W—B$^2$— wherein B$^1$ and B$^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (5)

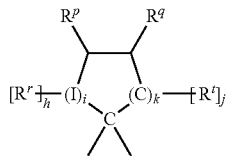

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is 1 and i is 0, the ring as shown in formula (5) contains 4 carbon atoms, when k is 2, the ring as shown in formula (5) contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include compounds of formula (6)

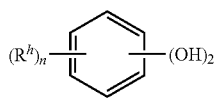

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis (4-hydroxy-t-butylphenyl) propane, 3,3-bis(4-hydroxyphenyl) phthalimidine, 2-phenyl-3,3-bis(4-hydroxyphenyl) phthalimidine (p,p-PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The homopolymer of DMBPC carbonate, which is represented by the x portion of formula (7) or its copolymer with BPA carbonate has an overall chemical structure represented by formula (7)

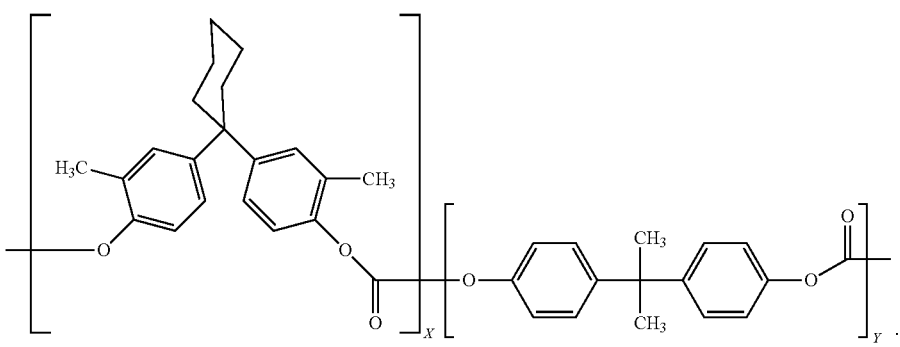

(7)

DMBPC carbonate can be co-polymerized with BPA carbonate to form a DMBPC BPA co-polycarbonate. For example, DMBPC based polycarbonate as a copolymer or homopolymer (DMBPC) can comprise 10 to 100 mol % DMBPC carbonate and 90 to 0 mol % BPA carbonate.

The method of making any of the polycarbonates herein described is not particularly limited. It may be produced by any known method of producing polycarbonate including the interfacial process using phosgene and/or the melt process using a diaryl carbonate, such as diphenyl carbonate or bismethyl salicyl carbonate, as the carbonate source.

"Polycarbonates" as used herein further include homopolycarbonates, (wherein each $R^1$ in the polymer is the same), copolymers comprising different $R^1$ moieties in the carbonate (referred to herein as "copolycarbonates"), copolymers comprising carbonate units and other types of polymer units, such as ester units, and combinations comprising at least one of homopolycarbonates and/or copolycarbonates. As used herein, a "combination" is inclusive of blends, mixtures, alloys, reaction products, and the like.

The polycarbonate composition can further include impact modifier(s). Exemplary impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like. Impact modifiers are generally present in amounts of 1 to 30 wt. %, based on the total weight of the polymers in the composition.

In addition to the substrate resin, the composition used to form the substrate can include various additives ordinarily incorporated into polymer compositions of this type, with the proviso that the additive(s) are selected so as to not significantly adversely affect the desired properties of the polymeric composition, in particular hydrothermal resistance, water vapor transmission resistance, puncture resistance, and thermal shrinkage. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.01 to 5 wt. %, based on the total weight of the composition.

Light stabilizers and/or ultraviolet light (UV) absorbing stabilizers can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 parts by weight, based on 100 parts by weight of the total composition, excluding any filler.

UV light absorbing stabilizers include triazines, dibenzoylresorcinols (such as TINUVIN* 1577 commercially available from BASF and ADK STAB LA-46 commercially available from Asahi Denka), hydroxybenzophenones; hydroxybenzotriazoles; hydroxyphenyl triazines (e.g., 2-hydroxyphenyl triazine); hydroxybenzotriazines; cyanoacrylates; oxanilides; benzoxazinones; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1,3,5-triazin-2-yl]-5-(octyloxy)-phenol (CYASORB* 1164); 2,2'-(1,4-phenylene) bis(4H-3,1-benzoxazin-4-one) (CYASORB* UV-3638); 1,3-bis[(2-cyano-3,3-diphenylacryloyl)oxy]-2,2-bis[[(2-cyano-3, 3-diphenylacryloyl)oxy]methyl]propane (UVINUL* 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with a particle size less than or equal to 100 nanometers, or combinations comprising at least one of the foregoing UV light absorbing stabilizers. UV light absorbing stabilizers are used in amounts of 0.01 to 5 parts by weight, based on 100 parts by weight of the total composition, excluding any filler.

Turning now to the coating layers, the first coating layer can comprise a coating composition comprising a urethane acrylate oligomer having a functionality of 2 to 15 acrylate functional groups, an acrylate monomer having a functionality of 1 to 5 acrylate functional groups, and an optional photoinitiator. The urethane acrylate oligomers can contain, on average, 2 to 15 acrylate functional groups, specifically, 2 to 10 acrylate functional groups.

The coating composition of the first coating layer can further comprise acrylate monomers (i.e., meth(acrylate)

monomer) containing an acrylate functional group, specifically 1 to 5, and more specifically 1 to 3.

The coating composition can, optionally, further comprise a polymerization initiator to promote polymerization of the acrylate components. Suitable polymerization initiators can include photoinitiators that promote polymerization of the components upon exposure to ultraviolet radiation.

The coating composition can comprise urethane acrylate oligomers in the amount of 30 to 90 weight percent (wt. %), specifically 40 to 85 wt. %, more specifically 50 to 80 wt. %; acrylate monomers present in the amount of 5 to 50 wt. %, specifically 8 to 45 wt. %, more specifically 10 to 30 wt. %; and optional polymerization initiator present in the amount of 0 to 10 wt. %, specifically 2 to 8 wt. %, more specifically 3 to 7 wt. %, wherein weight is based on 100 wt. % solid content of the coating composition.

The urethane acrylate can include a compound produced by reacting an aliphatic isocyanate with an oligomeric diol such as a polyester diol or polyether diol to produce an isocyanate capped oligomer. This oligomer is then reacted with hydroxy ethyl acrylate to produce the urethane acrylate.

The urethane acrylate oligomer specifically can be an aliphatic urethane acrylate, for example, a wholly aliphatic urethane (meth)acrylate oligomer based on an aliphatic polyol, which is reacted with an aliphatic polyisocyanate and acrylated. In one embodiment, it can be based on a polyol ether backbone. For example, an aliphatic urethane acrylate oligomer can be the reaction product of (i) an aliphatic polyol; (ii) an aliphatic polyisocyanate; and (iii) an end capping monomer capable of supplying reactive terminus. The polyol (i) can be an aliphatic polyol, which does not adversely affect the properties of the composition when cured. Examples include polyether polyols; hydrocarbon polyols; polycarbonate polyols; polyisocyanate polyols, and mixtures thereof.

The second coating layer can comprise the same photoinitiator and monomer diluent as described with respect to the first coating layer, but the urethane acrylate oligomers can be different, making the coating of the second coating layer a flexible coating. For example, the second coating layer can generally comprise a second coating composition that can comprise urethane acrylates with a lower functionality than those used in the first coating layer. The second coating layer can comprise an aliphatic urethane tetraacrylate (i.e., a maximum functionality of 4) that can be diluted 20% by weight with a reactive diluent monomer previously described, e.g., 1,6-hexanediol diacrylate (HDDA), tripropyleneglycol diacrylate (TPGDA), and trimethylolpropane triacrylate (TMPTA). A commercially available urethane acrylate that can be used in forming the coating of the second coating layer can be EBECRYL™ 8405 and EBECRYL™ 8402 from Cytec Industries Inc.

Some commercially available oligomers which can be used in the first and second coating layers can include, but are not limited to, multifunctional aliphatic urethane acrylates that are part of the following families: the PHOTOMER™ Series of aliphatic urethane acrylate oligomers from IGM Resins, Inc., St. Charles, Ill.; the Sartomer SR Series of aliphatic urethane acrylate oligomer from Sartomer Company, Exton, Pa.; the Echo Resins Series of aliphatic urethane acrylate oligomers from Echo Resins and Laboratory, Versailles, Mo.; the BR Series of aliphatic urethane acrylates from Bomar Specialties, Winsted, Conn.; and the EBECRYL™ Series of aliphatic urethane acrylate oligomers from Cytec Industries, Smyrna, Ga. For example, the aliphatic urethane acrylates can be KRM8452 (10 functionality, Cytec), EBERCRYL 1290™ (6 functionality, Cytec), EBECRYL 1290N™ (6 functionality, Cytec), EBERCRYL 512™ (6 functionality, Cytec), EBECRYL 8702™ (6 functionality, Cytec), EBERCRYL 8405™ (3 functionality, Cytec), EBECRYL 8402™ (2 functionality, Cytec), EBERCRYL 284™ (3 functionality, Cytec), CN9010*(Sartomer), CN9013™ (Sartomer).

Another component of the first and/or second coating composition can be a reactive monomer diluent having one or more acrylate or methacrylate moieties per monomer molecule. The reactive acrylate monomer diluent can be mono-, di-, tri-, tetra- or penta functional. In one embodiment, di-functional monomers are employed for the desired flexibility and adhesion of the coating. The monomer can be straight- or branched-chain alkyl, cyclic, or partially aromatic. The reactive monomer diluent can also comprise a combination of monomers that, on balance, result in a suitable adhesion for coating composition on the substrate, which cures to form a hard, flexible material having the desired properties.

The reactive monomer diluent, within the limits discussed above, can include monomers having a plurality of acrylate or methacrylate moieties. These can be di-, tri-, tetra- or penta-functional, specifically di-functional, in order to increase the crosslink density of the cured coating and therefore to increase modulus without causing brittleness. Examples of polyfunctional monomers include, but are not limited, to $C_6$-$C_{12}$ hydrocarbon diol diacrylates or dimethacrylates such as 1,6-hexanediol diacrylate and 1,6-hexanediol dimethacrylate; tripropylene glycol diacrylate or dimethacrylate; neopentyl glycol diacrylate or dimethacrylate; neopentyl glycol propoxylate diacrylate or dimethacrylate; neopentyl glycol ethoxylate diacrylate or dimethacrylate; 2-phenoxylethyl (meth)acrylate; alkoxylated aliphatic (meth)acrylate; polyethylene glycol (meth)acrylate; lauryl (meth)acrylate, isodecyl (meth)acrylate, isobornyl (meth) acrylate, tridecyl (meth)acrylate; and mixtures comprising at least one of the foregoing monomers. For example, the monomer can be 1,6-hexanediol diacrylate (HDDA), alone or in combination with another monomer, such as tripropyleneglycol diacrylate (TPGDA), trimethylolpropane triacrylate (TMPTA), oligotriacrylate (OTA 480), or octyl/decyl acrylate (ODA).

Another component of the first and/or second coating composition can be an optional polymerization initiator such as a photoinitiator. Generally, a photoinitiator is used if the coating composition is to be ultraviolet cured; if it is to be cured by an electron beam, the coating composition can comprise substantially no photoinitiator.

When the coating is cured by ultraviolet light, the photoinitiator, when used in a small but effective amount to promote radiation cure, can provide reasonable cure speed without causing premature gelation of the coating composition. Further, it can be used without interfering with the optical clarity of the cured coating material. Still further, the photoinitiator can be thermally stable, non-yellowing, and efficient.

Photoinitiators can include, but is not limited to, the following: hydroxycyclohexylphenyl ketone; hydroxymethylphenylpropanone; dimethoxyphenylacetophenone; 2-methyl-1-[4-(methylthio)phenyl]-2-morpholinopropanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy) phenyl-(2-hydroxy-2-propyl) ketone; diethoxyacetophenone; 2,2-di-sec-butoxyacetophenone; diethoxy-phenyl acetophenone; bis (2,6-dimethoxybenzoyl)-2,4-, 4-trimethylpentylphosphine oxide; 2,4,6-trimethylbenzoyldiphenylphosphine oxide; 2,4, 6-trimethylbenzoylethoxyphenylphosphine oxide; and combinations comprising at least of the foregoing.

Exemplary photoinitiators include phosphine oxide photoinitiators. Examples of such photoinitiators include the IRGACURE™, LUCIRIN™ and DAROCURE™ series of phosphine oxide photoinitiators available from BASF Corp.; the ADDITOL™ series from Cytec Industries; and the ESACURE™ series of photoinitiators from Lamberti, s.p.a. Other useful photoinitiators include ketone-based photoinitiators, such as hydroxy- and alkoxyalkyl phenyl ketones, and thioalkylphenyl morpholinoalkyl ketones. Also suitable are benzoin ether photoinitiators. Specific exemplary photoinitiators are bis(2,4,6-trimethylbenzoyl)-phenylphosphine oxide supplied as IRGACURE™ 819 by BASF or 2-hydroxy-2-methyl-1-phenyl-1-propanone supplied as ADDITOL HDMAP™ by Cytec Industries or 1-hydroxy-cyclohexyl-phenyl-ketone supplied as IRGACURE™ 184 by BASF or 2-hydroxy-2-methyl-1-phenyl-1-propanone supplied as DAROCURE™ 1173 by BASF.

The photoinitiator can be chosen such that the curing energy is less than 2.0 J/cm$^2$, and specifically less than 1.0 J/cm$^2$, when the photoinitiator is used in the designated amount.

The polymerization initiator can include peroxy-based initiators that can promote polymerization under thermal activation. Examples of useful peroxy initiators include benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy) hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di (trimethylsilyl)peroxide, trimethylsilylphenyltriphenylsilyl peroxide, and the like, and combinations comprising at least one of the foregoing polymerization initiators.

The thickness of the substrate can vary depending upon the desired end use of the multilayer sheet. The substrate can comprise a monolithic (e.g., one wall, one layer) sheet or a multiwall sheet (e.g., comprising greater than one wall with greater than one air channel located therebetween) or a multilayer sheet. A multilayer sheet generally comprises greater than one core layer. Generally, the thickness of the substrate can be less than or equal to 2 millimeters (mm), specifically, 0.1 mm to 2 mm, more specifically, 0.2 mm to 1.75 mm, even more specifically, 0.375 mm to 1.5 mm, and still more specifically, 0.4 mm to 1.2 mm, as well as any and all ranges and endpoints located therebetween.

As with the core layer, the thickness of the coating layers can vary depending upon the desired end use of the multilayer sheet. The thickness of the first coating layer and the second coating layer can be the same or different. Generally, the thickness of each of the coating layers can be less than or equal to 50 (µm) micrometers, specifically 2 to 40 µm, more specifically, 3 to 30 µm, as well as any and all ranges and endpoints located therebetween. For example, when using flow coating to apply the coating layers, the thickness from end to end of the coating layer can vary from 3 to 20 µm.

The substrate and/or coating layers of the multilayer sheet can, optionally, include various additives ordinarily incorporated into compositions of this type, with the proviso that the additive(s) are selected so as to not significantly adversely affect the desired properties of the sheet, in particular, ball drop performance, taber abrasion, and pencil hardness. Such additives can be mixed at a suitable time during the mixing of the components for forming the compositions of the core and cap layers. Exemplary additives include impact modifiers, fillers, reinforcing agents, antioxidants, heat stabilizers, light stabilizers, ultraviolet (UV) light stabilizers, plasticizers, lubricants, antistatic agents, colorants (such as carbon black and organic dyes), surface effect additives, radiation stabilizers (e.g., infrared absorbing), flame retardants, anti-fingerprint agents, leveling agents, and anti-drip agents. A combination of additives can be used, for example a combination of a flame retardant heat stabilizer, mold release agent, and ultraviolet light stabilizer. In general, the additives can be used in the amounts generally known to be effective. The total amount of additives (other than any impact modifier, filler, or reinforcing agents) can generally be 0.001 to 5 wt. %, based on the total weight of the composition of the particular layer.

It is further contemplated that the multilayer sheet can comprise additional substrate and coating layers (e.g., greater than or equal to two substrate layers and/or greater than or equal to three coating layers). Additionally, the multilayer sheet can also comprise layers dispersed between the substrate and coating layers, for example, an interlayer or an adhesive layer, such that the substrate can then be in contact with the interlayer and the interlayer can be in contact with the coating layer, or any combination thereof. Additional layers or coatings can also be present on the surface of the coating layers (such that the coating layer is between the coating and the substrate). Such layers can include, but are not limited to, hardcoats (e.g., an abrasion resistant coating), UV resistant layers, IR absorbing layers, etc. The additional layers contemplated can be added with the proviso that they do not adversely affect the desired properties of the multilayer sheet (i.e., ability to pass a ball drop test from a distance of greater than or equal to 50 cm). Any feasible combination of the above described additional layers is also contemplated.

The multilayer sheet can be formed by various multilayer sheet forming techniques. Some exemplary techniques include co-extrusion (e.g., single or multi-manifold), lamination, coating, and so forth. The coating layers can be applied to the substrate by various coating methods including, but not limited to dip coating, bar coating, flow coating, spray coating and roll coating.

The following example is merely illustrative of the device disclosed herein and is not intended to limit the scope hereof.

EXAMPLES

Example 1

Several multilayer sheets were made to determine which coating layer compositions would result in the most desirable properties so that the multilayer sheet can pass a ball drop test from greater than or equal to 50 centimeters (cm) with 13.8 grams (g) steel ball and have a pencil hardness on a first surface of a substrate of the multilayer sheet of at least 4H. Table 1 lists some of the standards used in testing the multilayer sheets in the following examples. It is to be understood that taber abrasion as described herein was tested according to ASTM D1044-05 using a CS-10F wheel with 500 g loading, for 100 cvelec

TABLE 1

Testing methods, standards, and conditions

| | Standards | Testing Conditions |
|---|---|---|
| Pencil Hardness | ASTM D3363-05 | Mitsubishi Uni Pencil, 1 kg loading |
| Taber Abrasion | ASTM D1044-05 | CS-10F wheel, 500 g loading, 100 cycles, Δ Haze was measured and recorded |
| Yellowness Index (YI) | ASTM E313-10 | (UV Conditioning) UVB: 313 nm, intensity: 0.55 W/m2, 60° C., 72 h, the first coating layer is exposed to UV. |

Table 2 lists the components of the various coating compositions used in this example. The coatings were formulated at 100% solids and then diluted to 60% solids using butyl acetate as a diluting agent. The amounts of monomers and oligomers were varied to determine the effect on pencil hardness, taber abrasion, and ball drop performance. Pencil hardness and taber abrasion were tested according to the standards listed in Table 1. Ball drop testing was conducted using a lab-made ball drop tester. In the test, a 13.8 g steel ball was dropped freely onto a multilayer sheet from a certain distance. The distance was increased to a threshold height until the coating layer (cap layer) or substrate layer (core layer) began to crack as visibly seen to an unaided eye. Below this threshold height, no cracking occurs.

As seen in Table 2, Coating 1 contained 66.4 wt. % of KRM8452, commercially available from Cytec Industries, Inc., which is an undiluted aliphatic urethane ten acrylate oligomer offering high hardness and low shrinkage; 28.4 wt. % of SR238, commercially available from Sartomer Company, which is 1,6-hexane diacrylate and a low viscosity, high curing monomer with low volatility, a hydrophobic backbone, and good solvency for use in free radical polymerization; and 5.2 wt. % of IRGACURE™ 184, commercially available from BASF, which is a photoinitiator. The photoinitiator was used to facilitate curing of the coating under ultraviolet exposure. IRGACURE™ 184 is a non-yellowing photoinitiator which is used to initiate the photopolymerization of unsaturated prepolymers in combination with mono- or multifunctional vinyl monomers. Butyl acetate was used as a solvent to dilute the coating liquid for bar/dip coating. Coating 2 contained 66.4 wt. % of EBECRYL™ 8405, commercially available from Cytec Industries, Inc., which is an aliphatic urethane acrylate; 28.4 wt. % of SR238; and 5.2 wt. % of IRGACURE™ 184. Coating 3 contained 100 wt. % of UVHC7800, commercially available from MOMENTIVE™ as SilFORT™, which is an ultraviolet curable hardcoat material for plastic surface. UVHC7800 uses 1-methoxy-2-propanol as a solvent and a UV based acrylate coating with nano-filler technology.

As can be seen in Table 2, Coating 1 and Coating 3 both have a high pencil hardness and a low taber abrasion (less than or equal to (≤)5%) and are considered hard coatings (pencil hardness of greater than or equal to 4H), while Coating 2 has a low pencil hardness and a high taber abrasion (greater than (>) 7%) and is considered a flexible coating.

The substrate layer(s) (i.e., cap layer and core layer) were formed from compositions comprising polymethyl methacrylate (PMMA) (e.g., Altuglas V021C commercially available from Arkema Group), polycarbonate (e.g., LEXAN™, commercially available from SABIC's Innovative Plastics business, LEXAN™ ML9737 resin), and combinations comprising at least one of the foregoing. The thickness of the substrate layer varied from 0.8 mm to 1.0 mm.

TABLE 2

Coating composition and main properties

| Coating No. | KRM 8452 | EBECRYL 8405 | SR238 | IRGACURE 184 | UVHC 7800 | Pencil hardness on PMMA | Taber | Coating Type |
|---|---|---|---|---|---|---|---|---|
| 1 | 66.4 | | 28.4 | 5.2 | | 4H | 4% | Hard |
| 2 | | 66.4 | 28.4 | 5.2 | | F | 8% | Flexible |
| 3 | | | | | 100 | 5H | 2% | Hard |

Samples 1 to 7 in Table 3 comprised a multilayer sheet comprising a substrate comprising a cap layer comprising PMMA and a core layer comprising polycarbonate (PC) along with various coating layers as illustrated in Table 3. The cap layer and the core layer were co-extruded to form a substrate layer having a thickness of 0.8 mm, with a coating layer having a thickness of 4 to 5 μm. The various coatings were applied on the outmost surfaces of the substrate (e.g., on the outermost surface of the PMMA side of the substrate and on the outermost surface of the PC side of the substrate) by bar coating. The PMMA side of the substrate is considered the first (e.g., top) surface of the substrate, while the PC side is considered the second (e.g., bottom) surface of the substrate.

As can be seen in Table 3, when Coating 1 (Sample 1) and Coating 3 (Sample 5) were applied on both sides of the substrate, high pencil hardness on the PMMA side of the substrate was obtained, but Samples 1 and 5 were unable to pass the ball drop test and even failed at a distance of less than 20 cm. When only Coating 2 was applied on both sides of the substrate (Sample 2), the pencil hardness was low on the PMMA side of the substrate, although Sample 2 was able to pass the ball drop test at a distance of greater than 100 cm. When applying Coating 1 or Coating 3 on the PMMA side of the substrate and applying Coating 2 on the PC side of the substrate (Samples 3 and 6, respectively), high pencil hardness (e.g., greater than or equal to 4H) and excellent ball drop performance can be achieved. Excellent ball drop performance generally refers to the ability of the multilayer sheet to withstand a drop from a distance of greater than or equal to 50 cm without breaking or cracking.

TABLE 3

Coating on PMMA/PC, pencil hardness, and ball drop performance

| Sample No. | PMMA side | PC side | Ball drop from PMMA to PC (cm) | Pencil hardness on PMMA side | Pencil hardness on PC side |
|---|---|---|---|---|---|
| 1 | Coating 1 | Coating 1 | <20 | 4H | HB |
| 2 | Coating 2 | Coating 2 | >100 | F | 3B |
| 3 | Coating 1 | Coating 2 | >100 | 4H | 3B |
| 4 | Coating 2 | Coating 1 | <20 | F | HB |
| 5 | Coating 3 | Coating 3 | <20 | 5H | HB |
| 6 | Coating 3 | Coating 2 | >100 | 5H | 3B |
| 7 | Coating 2 | Coating 3 | <20 | F | HB |

Samples 8 to 10 in Table 4 comprised a multilayer sheet comprising a substrate layer comprising polycarbonate having a thickness of 0.8 mm to form a sheet and various coating layers as illustrated in Table 4 where the coatings individually had a thickness of 4 to 5 µm and were applied by bar coating. For purposes of Samples 8 to 10, Side A is considered the first (e.g., top) surface of the substrate and Side B is considered the second (e.g., bottom) surface of the substrate. As can be seen in Table 4, when Coating 3 was applied to both sides of the substrate (Sample 8), high pencil hardness on Side A of the substrate was obtained, but Sample 8 was unable to pass the ball drop test and even failed at a distance of less than 20 cm. Similar results for the ball drop test were seen in Sample 10 when Coating 2 was applied to Side A and Coating 3 to Side B, but Sample 10 also had a low pencil hardness (3B) on Side A of the core layer. In Sample 9, where Coating 3 was applied to Side A and Coating 2 was applied to Side B, the multilayer sheet was able to pass the ball drop test at a distance of greater than 100 cm and had a high pencil hardness (e.g., F) on Side A of the substrate.

TABLE 4

Coating on PC, pencil hardness, and ball drop performance

| Sample No. | Side A | Side B | Ball drop from Side A to Side B (cm) | Pencil hardness on Side A | Pencil hardness on Side B |
|---|---|---|---|---|---|
| 8 | Coating 3 | Coating 3 | <20 | F | F |
| 9 | Coating 3 | Coating 2 | >100 | F | 3B |
| 10 | Coating 2 | Coating 3 | <20 | 3B | F |

Samples 11 to 13 in Table 5 comprised a multilayer sheet comprising a substrate comprising a core layer comprising polycarbonate copolymer and a cap layer comprising dimethyl cyclohexyl bisphenol polycarbonate (DMBPC) and various coating layers as illustrated in Table 5. The cap layer and the core layer were coextruded to form a substrate layer with the substrate layer having a thickness of 1.0 mm. A coating layer was applied by bar coating, where the coating layer had a thickness of 4 to 5 µm to form a multilayer sheet. The various coatings were applied on the outermost surfaces of the substrate (e.g., on the outermost surface of the DMBPC side of the substrate and on the outermost surface of the PC side of the substrate). For purposes of Samples 11 to 13, the DMBPC side of the substrates considered the first (e.g., top) surface of the substrate and the PC side of the substrates considered the second (e.g., bottom) surface of the substrate.

As can be seen in Table 5, when Coating 3 was applied to both sides of the substrate (Sample 11), the multilayer sheet was unable to pass the ball drop test and failed at a distance of less than 20 cm, although a high pencil hardness on the DMBPC side of the substrate was achieved. Sample 13 demonstrated opposite results when Coating 2 was applied to the DMBPC side of the substrate and Coating 3 was applied to the PC side of the substrate. As seen in Table 5, Sample 13 was able to pass the ball drop test at a distance of greater than 100 cm, but had a low pencil hardness rating at 3B. Sample 12, on which Coating 3 was applied to the DMBPC side and Coating 2 to the PC side, was able to pass the ball drop test at a distance of greater than 100 cm and also demonstrated a high pencil hardness rating of 3H.

TABLE 5

Coating on DMBPC/PC, pencil hardness, and ball drop performance

| Sample No. | DMBPC side | PC side | Ball drop from DMBPC to PC (cm) | Pencil hardness on DMBPC side | Pencil hardness on PC side |
|---|---|---|---|---|---|
| 11 | Coating 3 | Coating 3 | <20 | 3H | F |
| 12 | Coating 3 | Coating 2 | >100 | 3H | 3B |
| 13 | Coating 2 | Coating 3 | <20 | 3B | F |

Samples 3 and 6 demonstrate the ideal combination of properties for a multilayer sheet as described herein, e.g., able to pass the ball drop test at a distance of greater than or equal to 50 cm, specifically, greater than or equal to 60 cm, more specifically, greater than or equal to 70 cm, even more specifically, greater than or equal to 80 cm, still more specifically, greater than or equal to 90 cm, and yet more specifically, greater than or equal to 100 cm, and a pencil hardness of at least 4H, specifically at least 5H, on the first surface of the core layer, can be achieved when a hard coating as described herein is applied to the first surface of a substrate and a flexible coating is applied to the second surface of the substrate. Such a combination of properties cannot be attained when using a flexible coating on both the first surface and the second surface or when using a hard coating on both the first surface and the second surface. When using a flexible coating on the first surface and the second surface, the ball drop test can be passed, but low pencil hardness on the first surface can be expected; when using a hard coating on the first surface and the second surface, high pencil hardness on the first surface can be achieved, but the multilayer will not pass the ball drop test. When using a flexible coating on the first surface and a hard coating on the second surface, the ball drop test can be passed, but a low pencil hardness rating on the first surface can be expected. It was unexpectedly discovered that when using a hard coating on the first surface and a flexible coating on the second surface, the multilayer sheets can pass the ball drop test at a distance of greater than or equal to 50 cm and the first surface of the substrate can possess a high pencil hardness with a rating of at least 4H.

Example 2

Table 6 lists the components of the various coating compositions used in this example. The coatings were formulated at 100% solids and then diluted to 60% solids using butyl acetate as a diluting agent. The amounts of monomers and oligomers were varied to determine the effect on pencil hardness, taber abrasion, and ball drop performance. Pencil hardness and taber abrasion were tested according to the standards listed in Table 1. Ball drop testing was conducted using a lab-made ball drop tester. In the test, a 13.8 g steel ball was dropped freely onto a multilayer sheet from a certain distance. The distance was increased to a threshold height until the coating layer (cap layer) or substrate layer (core layer) began to crack. Below this threshold height, no cracking occurs.

As seen in Table 6, Coating 4 contained 82 wt. % of KRM 8452, commercially available from Cytec Industries, Inc., which is an undiluted aliphatic urethane ten acrylate oligomer developed for energy curable systems; 12.5 wt. % of SR 238, commercially available from Sartomer Company, which is 1,6-hexane diacrylate and a low viscosity, high curing monomer with low volatility, a hydrophobic backbone, and good solvency for use in free radical polymerization; and 5.5 wt. % of DAROCURE™ 1173, commercially available from Ciba™, which is a photoinitiator. The photoinitiator was used to facilitate curing of the coating under ultraviolet exposure. DAROCURE™ 1173 is a liquid photoinitiator which is used to initiate the photopolymerization of chemically unsaturated prepolymers, e.g., acrylates, in combination with mono- or multifunctional monomers. Butyl acetate was used as a solvent to dilute the coating liquid for bar/dip coating. Coating 5 contained 72 wt. % KRM 8452; 10 wt. % of EBECRYL™ 8702, commercially available from Cytec Industries, Inc., which is an aliphatic urethane hexaacrylate; 12.5 wt. % of SR 238; and 5.5 wt. % of DAROCURE™ 1173. Coating 6 contained 62 wt. % KRM 8452; 20 wt. % of EBECRYL™ 8702; 12.5 wt. % of SR 238; and 5.5 wt. % of DAROCURE™ 1173. Coating 7 contained 52 wt. % KRM 8452; 30 wt. % of EBECRYL™ 8702; 12.5 wt. % of SR 238; and 5.5 wt. % of DAROCURE™ 1173. Coating 8 contained 42 wt. % KRM 8452; 40 wt. % of EBECRYL™ 8702; 12.5 wt. % of SR 238; and 5.5 wt. % of DAROCURE™ 1173. Coating 9 contained 32 wt. % KRM 8452; 50 wt. % of EBECRYL™ 8702; 12.5 wt. % of SR 238; and 5.5 wt. % of DAROCURE™ 1173. Coating 10 contained 22 wt. % KRM 8452; 60 wt. % of EBECRYL™ 8702; 12.5 wt. % of SR 238; and 5.5 wt. % of DAROCURE™ 1173. Coating 11 contained 82 wt. % of EBECRYL™ 8702; 12.5 wt. % of SR 238; and 5.5 wt. % of DAROCURE™ 1173.

As can be seen in Table 6, Coating 4 and Coating 5 both have high pencil hardness and low taber abrasion and are considered hard coatings, while Coating 9, Coating 10, and Coating 11 each have a low pencil hardness and high taber abrasion and are considered a flexible coating, and Coatings 6, 7, and 8 are considered intermediate coatings. Table 6 demonstrates that the coating layer becomes flexible with increasing EBECRYL™ 8702 content (e.g., from 0 to 82 wt. %).

The substrate layer(s) (cap layer and core layer) were formed from compositions comprising polymethyl methacrylate (PMMA) (e.g., Altuglas V021C commercially available from Arkema Group), polycarbonate (e.g., LEXAN™, commercially available from SABIC's Innovative Plastics business, LEXAN™ ML9737 resin), and combinations comprising at least one of the foregoing. The thickness of the substrate layer varied from 0.8 mm to 1.0 mm.

TABLE 6

Coating compositions and properties thereof

| Coating No. | KRM 8452 | EBECRYL 8702 | SR 238 | DAROCURE 1173 | Pencil hardness on PMMA | Taber Abrasion | Coating Type |
|---|---|---|---|---|---|---|---|
| Coating 4 | 82 | 0 | 12.5 | 5.5 | 4H | 4.1% | Hard |
| Coating 5 | 72 | 10 | 12.5 | 5.5 | 4H | 4.5% | Hard |
| Coating 6 | 62 | 20 | 12.5 | 5.5 | 4H | 5.2% | Intermediate |
| Coating 7 | 52 | 30 | 12.5 | 5.5 | 4H | 5.3% | Intermediate |
| Coating 8 | 42 | 40 | 12.5 | 5.5 | 3H | 5.5% | Intermediate |
| Coating 9 | 32 | 50 | 12.5 | 5.5 | 3H | 7.4% | Flexible |
| Coating 10 | 22 | 60 | 12.5 | 5.5 | 2H | 8.9% | Flexible |
| Coating 11 | 0 | 82 | 12.5 | 5.5 | 2H | 12.5% | Flexible |

Samples 14 to 31 in Table 7 comprised a multilayer sheet comprising a substrate comprising a cap layer comprising PMMA and a core layer comprising polycarbonate (PC) along with various coating layers as illustrated in Table 3. The cap layer and the core layer were co-extruded to form a substrate having a thickness of 0.8 mm, with a coating layer thickness of 4 to 5 μm. The various coatings were applied on the outmost surfaces of the substrate (e.g., on the outermost surface of the PMMA side of the substrate and on the outermost surface of the PC side of the substrate) by bar coating. The PMMA side of the substrate is considered the first (e.g., top) surface of the substrate, while the PC side is considered the second (e.g., bottom) surface of the substrate. Coating 3, as previously described, was also used in some samples.

As can be seen in Table 7, Samples 18-21, where the PMMA side of the substrate had a hard coating and the PC side of the substrate had either an intermediate or flexible coating, desirable ball drop performance (i.e., greater than or equal to 50 cm, specifically, greater than or equal to 70 cm), pencil hardness on the PMMA side (i.e., greater than or equal to 4H, specifically, greater than or equal to 5H), and pencil hardness on the PC side (i.e., less than or equal to B, specifically, less than or equal to HB) was achieved. Similar results were achieved with Samples 26, 27, 28, and 29 which had a hard coating (Coating 4) on the PMMA side of the substrate and an intermediate or flexible coating (Coatings 8, 9, 10, and 11, respectively) on the PC side of the substrate. Conversely, when a hard coating was used on both sides of the substrate (Samples 14 and 15, and 22 and 23), the ball drop performance dropped significantly. These samples further demonstrate that the ideal combination of properties for a multilayer sheet as described herein, e.g., able to pass the ball drop test at a distance of greater than or equal to 50 cm, specifically, greater than or equal to 60 cm, more specifically, greater than or equal to 70 cm, even more specifically, greater than or equal to 80 cm, still more specifically, greater than or equal to 90 cm, and yet more specifically, greater than or equal to 100 cm, and a pencil hardness of at least 4H, specifically at least 5H, on the first surface of the core layer, can be achieved when a hard coating as described herein is applied to the first surface of a substrate and a flexible coating is applied to the second surface of the substrate.

TABLE 7

Coating on PMMA/PC, pencil hardness, and ball drop performance

| Sample No. | PMMA side | PC side | Ball drop from PMMA to PC (cm) | Pencil hardness on PMMA side | Pencil hardness on PC side |
|---|---|---|---|---|---|
| 14 | Coating 3 | Coating 4  | <20  | 5H | F  |
| 15 | Coating 3 | Coating 5  | 30   | 5H | F  |
| 16 | Coating 3 | Coating 6  | 30   | 5H | HB |
| 17 | Coating 3 | Coating 7  | 40   | 5H | HB |
| 18 | Coating 3 | Coating 8  | 70   | 5H | HB |
| 19 | Coating 3 | Coating 9  | >100 | 5H | B  |
| 20 | Coating 3 | Coating 10 | >100 | 5H | B  |
| 21 | Coating 3 | Coating 11 | >100 | 5H | B  |
| 22 | Coating 4 | Coating 4  | <20  | 4H | F  |
| 23 | Coating 4 | Coating 5  | 30   | 4H | F  |
| 24 | Coating 4 | Coating 6  | 30   | 4H | HB |
| 25 | Coating 4 | Coating 7  | 50   | 4H | HB |
| 26 | Coating 4 | Coating 8  | 70   | 4H | HB |
| 27 | Coating 4 | Coating 9  | >100 | 4H | B  |
| 28 | Coating 4 | Coating 10 | >100 | 4H | B  |
| 29 | Coating 4 | Coating 11 | >100 | 4H | B  | wt. % of TINUVIN™ 123. Coating 16 contained 74.5 wt. % of EBECRYL™ 8702; 20 wt. % of SR 238; 5.5 wt. % of IRGACURE™ 184; 3.0 wt. % of TINUVIN™ 400; and 1.0 wt. % of TINUVIN™ 123. Coating 17 contained 54.5 wt. % of KRM 8452; 20 wt. % of EBECRYL™ 8702; 20 wt. % of SR 238; 5.5 wt. % of IRGACURE™ 184; 2.0 wt. % of TINUVIN™ 400; and 2.0 wt. % of TINUVIN™ 292, commercially available from BASF, which is a liquid HALS.

As can be seen in Table 8, Coating 12 has a high pencil hardness and a low taber abrasion and is considered a hard coating, while Coatings 14, 15, and 16 each have a low pencil hardness and high taber abrasion and are considered flexible coatings, and Coatings 13 and 17 are considered to be intermediate coatings.

The substrate layer(s) (cap layer and core layer) were formed from compositions comprising polymethyl methacrylate (PMMA) (e.g., Altuglas V021C commercially available from Arkema Group), polycarbonate (e.g., LEXAN™, commercially available from SABIC's Innovative Plastics business, LEXAN™ ML9737 resin), and combinations comprising at least one of the foregoing. The thickness of the substrate layer varied from 0.8 mm to 1.0 mm.

TABLE 8

Weatherable Coating Composition and Properties

| Coating No. | KRM 8452 | Ebecryl 8702 | SR 238 | Irgacure 184 | Tinuvin 400 | Tinuvin 123 | Tinuvin 292 | PH[1] | TA[2] | CT[3] |
|---|---|---|---|---|---|---|---|---|---|---|
| Coating 12 | 74.5 | 0    | 20 | 5.5 | 3.0 | 1.0 | 0 | 4H | 4.9%  | H |
| Coating 13 | 54.5 | 20   | 20 | 5.5 | 3.0 | 1.0 | 0 | 4H | 5.3%  | I |
| Coating 14 | 34.5 | 40   | 20 | 5.5 | 3.0 | 1.0 | 0 | 3H | 7.9%  | F |
| Coating 15 | 14.5 | 60   | 20 | 5.5 | 3   | 1   | 0 | 3H | 10.0% | F |
| Coating 16 | 0    | 74.5 | 20 | 5.5 | 3   | 1   | 0 | 2H | 12.7% | F |
| Coating 17 | 54.5 | 20   | 20 | 5.5 | 2   | 0   | 2 | 4H | 5.7%  | I |

[1]PH is pencil hardness on PMMA.
[2]TA is taber abrasion.
[3]CT is coating type; "H" for hard, "I" for intermediate, and "F" for flexible.

Example 3

For weatherable coatings, the formulations listed in Table 8 were applied on a PMMA/PC substrate as described with respect to Example 2. Pencil hardness and ball drop performance were tested and results are listed in Table 9. As seen in Table 8, Coating 12 contained 74.5 wt. % of KRM 8452; 20 wt. % of SR 238; 5.5 wt. % of IRGACURE™ 184, commercially available from Ciba*, which is a photoinitiator; 3.0 wt. % of TINUVIN™ 400, commercially available from BASF, which is a hydroxyphenyltriazines; and 1.0 wt. % of TINUVIN™ 123, commercially available from BASF, which is a liquid hindered amine light stabilizer (HALS) based on aminoether functionality. Butyl acetate was used as a solvent to dilute the coating liquid for bar/dip coating. Coating 13 contained 54.5 wt. % of KRM 8452; 20 wt. % of EBECRYL™ 8702; 20 wt. % of SR 238; 5.5 wt. % of IRGACURE™ 184; 3.0 wt. % of TINUVIN™ 400; and 1.0 wt. % of TINUVIN™ 123. Coating 14 contained 34.5 wt. % of KRM 8452; 40 wt. % of EBECRYL™ 8702; 20 wt. % of SR 238; 5.5 wt. % of IRGACURE™ 184; 3.0 wt. % of TINUVIN™ 400; and 1.0 wt. % of TINUVIN™ 123. Coating 15 contained 14.5 wt. % of KRM 8452; 60 wt. % of EBECRYL™ 8702; 20 wt. % of SR 238; 5.5 wt. % of IRGACURE™ 184; 3.0 wt. % of TINUVIN™ 400; and 1.0

Samples 30 to 42 in Table 9 comprised a multilayer sheet comprising a substrate comprising a cap layer comprising PMMA and a core layer comprising polycarbonate (PC) along with various coating layers as illustrated in Table 9. The cap layer and the core layer were co-extruded to form a substrate having a thickness of 0.8 mm, with a coating layer thickness of 4 to 5 μm. The various coatings were applied on the outmost surfaces of the substrate (e.g., on the outermost surface of the PMMA side of the substrate and on the outermost surface of the PC side of the substrate) by bar coating. The PMMA side of the substrate is considered the first (e.g., top) surface of the substrate, while the PC side is considered the second (e.g., bottom) surface of the substrate.

Table 9 lists the standard and conditions used for Yellowness Index (YI) testing. As can be seen in Table 9, when the combination of a flexible coating on the PMMA side of the substrate and a hard coating on the PC side of the substrate were used, desired values for ball drop, pencil hardness on the PMMA side, pencil hardness on the PC side, and delta YI were achieved. It was desired that the change in YI be less than or equal to 4% after exposure to UVB for 72 hours as described in Table 1.

TABLE 9

Weatherable Coating on PMMA/PC, pencil hardness and ball drop performance

| No. | PMMA side | PC side | Ball drop from PMMA to PC (cm) | Pencil hardness on PMMA side | Pencil hardness on PC side | YI as received | YI after exposure to UVB 72 hours | Delta YI |
|---|---|---|---|---|---|---|---|---|
| 30 | Coating 12 | Coating 12 | 20 | 4H | HB | 0.73 | 4.44 | 3.71 |
| 31 | Coating 12 | Coating 13 | 30 | 4H | HB | 0.71 | 4.61 | 3.90 |
| 32 | Coating 12 | Coating 14 | >100 | 4H | B | 0.69 | 4.60 | 3.91 |
| 33 | Coating 12 | Coating 15 | >100 | 4H | B | 0.69 | 4.62 | 3.93 |
| 34 | Coating 12 | Coating 16 | >100 | 4H | B | 0.66 | 5.03 | 4.37 |
| 35 | Coating 12 | Coating 17 | 40 | 4H | HB | 0.71 | 4.76 | 4.05 |
| 36 | Coating 3 | Coating 12 | 20 | 5H | HB | 0.60 | 8.79 | 8.19 |
| 37 | Coating 3 | Coating 13 | 30 | 5H | HB | 0.56 | 8.96 | 8.40 |
| 38 | Coating 3 | Coating 14 | >100 | 5H | B | 0.52 | 8.85 | 8.33 |
| 39 | Coating 3 | Coating 15 | >100 | 5H | B | 0.57 | 9.01 | 8.44 |
| 40 | Coating 3 | Coating 16 | >100 | 5H | B | 0.56 | 9.08 | 8.52 |
| 41 | Coating 3 | Coating 17 | 40 | 5H | HB | 0.56 | 9.26 | 8.70 |
| 42 | Coating 3 | Coating 8 | 40 | 5H | HB | 0.54 | 8.15 | 7.61 |

Set forth below are some embodiments of the multilayer sheet.

Embodiment 1

A multilayer sheet, comprising: a substrate comprising a cap layer comprising a polymeric material and a core layer, wherein when joined, the cap layer forms a first surface of the substrate and the core layer forms a second surface of the substrate; a first coating layer disposed on the first surface of the substrate, wherein the first coating is a hard coating; and a second coating layer disposed on the second surface of the substrate, wherein the second coating is a flexible coating; wherein the multilayer sheet passes a ball drop test from a distance of greater than or equal to 50 centimeters.

Embodiment 2

The multilayer sheet of Embodiment 1, wherein the distance is greater than or equal to 70 centimeters.

Embodiment 3

A multilayer sheet, comprising: a substrate comprising a cap layer comprising a material selected from the group consisting of polymethyl methacrylate, polycarbonate, and combinations comprising at least one of the foregoing, wherein the substrate has a first surface and a second surface; a first coating layer disposed on the first surface; and a second coating layer disposed on the second surface; wherein the multilayer sheet passes a ball drop test from a distance of greater than or equal to 70 centimeters and wherein the first coating layer has a pencil hardness as measured according to ASTM D3363-05 of greater than or equal to 4H.

Embodiment 4

A multilayer sheet, comprising: a substrate comprising a cap layer comprising a polymeric material; and a core layer, wherein when joined, the cap layer is a first surface of the substrate and the core layer is a second surface of the substrate; a first coating layer disposed on the first surface of the substrate, wherein the first coating layer comprises a urethane acrylate oligomer having an acrylate functionality of 2 to 15, and an acrylate monomer having a functionality of 1 to 5; and a second coating layer disposed on the second surface of the substrate, wherein the second coating layer comprises a urethane acrylate.

Embodiment 5

The multilayer sheet of any of Embodiments 1-4, wherein the cap layer comprises a material selected from the group consisting of polycarbonate, polymethyl methacrylate, and combinations comprising at least one of the foregoing.

Embodiment 6

The multilayer sheet of any of Embodiments 1-5, wherein the core layer comprises polycarbonate.

Embodiment 7

The multilayer sheet of any of Embodiments 1-6, wherein the core layer comprises bisphenol-A polycarbonate, dimethyl bisphenol cyclohexane polycarbonate, and combinations comprising at least one of the foregoing.

Embodiment 8

The multilayer sheet of any of Embodiments 1-7, wherein the cap layer has a pencil hardness as measured according to ASTM D3363-05 of greater than or equal to 4H and wherein the second coating layer has a pencil hardness as measured according to ASTM D3363-05 of greater than or equal to B.

Embodiment 9

The multilayer sheet of any of Embodiments 1-8, wherein the cap layer pencil hardness is greater than or equal to 5H and a second cap layer pencil hardness is less than or equal to HB.

Embodiment 10

The multilayer sheet of any of Embodiments 1-9, wherein the first coating comprises an acrylate oligomer.

Embodiment 11

The multilayer sheet of any of Embodiments 1-10, wherein the second coating layer comprises an acrylate oligomer and a photoinitiator.

Embodiment 12

The multilayer sheet of any of Embodiments 1-11, wherein the first coating layer has a Taber Abrasion as measured according to ASTM D1044-05 of less than or equal to 5%.

Embodiment 13

The multilayer sheet of any of Embodiments 1-12, wherein the second coating layer has a Taber Abrasion as measured according to ASTM D1044-05 of greater than or equal to 7%.

Embodiment 14

The multilayer sheet of any of Embodiments 1-13, wherein the first coating layer comprises a urethane acrylate oligomer having an acrylate functionality of 2 to 15, and an acrylate monomer having a functionality of 1 to 5.

Embodiment 15

The multilayer sheet of any of Embodiments 1-14, wherein the second coating layer comprises a urethane acrylate.

Embodiment 16

The multilayer sheet of Embodiment 15, wherein the urethane acrylate of the second coating layer comprises an aliphatic urethane tetraacrylate.

Embodiment 17

The multilayer sheet of any of Embodiments 1-16, wherein the first coating layer comprises 30 to 90 weight percent of the urethane acrylate oligomer; 5 to 50 weight percent of the acrylate monomer; and 0 to 10 weight percent of an optional photoinitiator, wherein weight percent is based upon the total weight of the coating composition.

Embodiment 18

The multilayer sheet of Embodiment 17, wherein the urethane acrylate oligomer comprises an aliphatic urethane acrylate oligomer and wherein the acrylate monomer comprises a methacrylate monomer.

Embodiment 19

The multilayer sheet of any of Embodiments 1-18, wherein the first coating layer further comprises a photoinitiator.

Embodiment 20

The multilayer sheet of any of Embodiments 17-19, wherein the photoinitiator comprises hydroxycyclohexylphenyl ketone; hydroxymethylphenylpropanone; dimethoxyphenylacetophenone; 2-methyl-1-[4-(methylthio)phenyl]-2-morpholinopropanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy) phenyl-(2-hydroxy-2-propyl) ketone; diethoxyacetophenone; 2,2-di-sec-butoxyacetophenone; diethoxy-phenyl acetophenone; bis (2,6-dimethoxybenzoyl)-2,4-,4-trimethylpentylphosphine oxide; 2,4,6-trimethylbenzoyldiphenylphosphine oxide; 2,4,6-trimethylbenzoylethoxyphenylphosphine oxide; and combinations comprising at least of the foregoing.

Embodiment 21

The multilayer sheet of any of claims 1-20, wherein the cap layer comprises polycarbonate, or consists of polycarbonate.

Embodiment 22

The multilayer sheet of any of claims 1-20, wherein the cap layer comprises polymethyl methacrylate, or consists of polymethyl methacrylate.

Embodiment 23

The multilayer sheet of any of claims 1-22, wherein the core layer comprises bisphenol-A polycarbonate, or consists of bisphenol-A polycarbonate.

Embodiment 24

The multilayer sheet of any of claims 1-22, wherein the core layer comprises dimethyl bisphenol cyclohexane polycarbonate, or consists of dimethyl bisphenol cyclohexane polycarbonate.

Embodiment 25

The multilayer sheet of any of Embodiments 1-24, wherein the first coating layer comprises 30 to 90 weight percent of the urethane acrylate oligomer; 5 to 50 weight percent of the acrylate monomer; and greater than 0 to 10 weight percent of a photoinitiator, wherein weight percent is based upon the total weight of the coating composition.

Embodiment 26

An article comprising the multilayer sheet of any of Embodiments 1-25.

Embodiment 27

A method of making the multilayer sheet of any of Embodiments 1-25, comprising: forming the substrate; applying the first coating layer on the first surface; and applying a second coating layer on the second surface.

Embodiment 28

A method of making a multilayer sheet, comprising: forming a substrate comprising a cap layer comprising a material selected from the group consisting of polymethyl methacrylate, polycarbonate, and combinations comprising at least one of the foregoing, wherein the substrate has a first surface and a second surface; applying a first coating layer on the first surface; and applying a second coating layer on the second surface; wherein the multilayer sheet passes a ball drop test from a distance of greater than or equal to 70 centimeters and wherein the first coating layer has a pencil hardness as measured according to ASTM D3363-05 of greater than or equal to 4H.

Embodiment 29

A method of making the multilayer sheet of any of Embodiments 1-25, comprising: forming a substrate comprising a cap layer, wherein the substrate has a first surface and a second surface; applying a first coating layer on the first surface; and applying a second coating layer on the second surface.

Embodiment 30

The method of any of Embodiments 28-29, wherein the polycarbonate comprises bisphenol-A polycarbonate, dimethyl bisphenol cyclohexane polycarbonate, and combinations comprising at least one of the foregoing.

Embodiment 31

The method of any of Embodiments 28-30, further comprising co-extruding a core layer with the cap layer, wherein the core layer forms the second surface of the substrate, before applying the first coating layer and the second coating layer.

Embodiment 32

An article made by the method of any of Embodiments 28-31.

As used herein, flexible<intermediate<hard; wherein flexible refers to a Taber Abrasion value of greater than 7%, hard refers to a Taber Abrasion value of less than or equal to 5%, and intermediate refers to a Taber Abrasion value between flexible and hard (i.e., greater than 5% to less than or equal to 7%). Taber Abrasion values were measured according to ASTM D1044-05 with CS-10F wheels, 500 g weight and 100 cycles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A multilayer sheet, comprising:
    a substrate comprising
        a cap layer comprising a polymeric material; and
        a core layer, wherein when joined, the cap layer forms a first surface of the substrate and the core layer forms a second surface of the substrate;
    a first coating layer disposed on the first surface of the substrate, wherein the first coating is a hard coating with a Taber Abrasion as measured according to ASTM D1044-05 of less than or equal to 5%; and
    a second coating layer disposed on the second surface of the substrate, wherein the second coating is a flexible coating with a Taber Abrasion as measured according to ASTM D1044-05 of greater than or equal to 7%;
    wherein the multilayer sheet passes a ball drop test from a distance of greater than or equal to 50 centimeters.

2. The multilayer sheet of claim 1,
    wherein the first coating layer comprises a urethane acrylate oligomer having an acrylate functionality of 2 to 15, and an acrylate monomer having a functionality of 1 to 5; and
    wherein the second coating layer comprises a urethane acrylate.

3. The multilayer sheet of claim 1, wherein the distance is greater than or equal to 70 centimeters.

4. The multilayer sheet of claim 1, wherein the core layer comprises dimethyl bisphenol cyclohexane polycarbonate.

5. The multilayer sheet of claim 1,
    wherein the substrate comprises a material selected from the group consisting of polymethyl methacrylate, polycarbonate, and combinations comprising at least one of the foregoing, wherein the substrate has a first surface and a second surface;
    and
    wherein the multilayer sheet passes a ball drop test from a distance of greater than or equal to 70 centimeters and wherein the first coating layer has a pencil hardness as measured according to ASTM D3363-05 of greater than or equal to 4H.

6. The multilayer sheet of claim 5,
    wherein at least one of the first coating layer and the second coating layer comprises an acrylate oligomer and a photoinitiator;
    wherein the photoinitiator comprises at least one of hydroxycyclohexylphenyl ketone; hydroxymethylphenylpropanone; dimethoxyphenylacetophenone; 2-methyl-1-[4-(methylthio)phenyl]-2-morpholinopropanone-1; 1-(4-isopropylphenyl)-2-hydroxy-2-methyl-propan-1-one; 1-(4-dodecylphenyl)-2-hydroxy-2-methylpropan-1-one; 4-(2-hydroxyethoxy) phenyl-(2-hydroxy-2-propyl) ketone; diethoxyacetophenone; 2,2-di-sec-butoxyacetophenone; diethoxy-phenyl acetophenone; bis (2,6-dimethoxybenzoyl)-2,4-, 4-trimethylpentylphosphine oxide; 2,4,6-trimethylbenzoyldiphenylphosphine oxide; 2,4,6-trimethylbenzoylethoxyphenylphosphine oxide; and combinations comprising at least of the foregoing; and
    wherein the urethane acrylate of the second coating layer comprises an aliphatic urethane tetraacrylate.

7. The multilayer sheet of claim 1, wherein the cap layer comprises at least one of polycarbonate, and polymethyl methacrylate.

8. The multilayer sheet of claim 1, wherein at least one of the first coating layer and the second coating layer comprises an acrylate oligomer and a photoinitiator.

9. The multilayer sheet of claim 1, wherein the first coating layer further comprises a photoinitiator, and wherein the photoinitiator comprises is selected from hydroxycyclohexylphenyl ketone; hydroxymethylphenylpropanone; dimethoxyphenylacetophenone; 2-methyl-1-[4-(methylthio)phenyl]-2-morpholinopropanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-(2-hydroxy-2-propyl) ketone; diethoxyacetophenone; 2,2-di-sec-butoxyacetophenone; diethoxy-phenyl acetophenone; bis (2,6-dimethoxybenzoyl)-2,4-, 4-trimethylpentylphosphine oxide; 2,4,6-trimethylbenzoyldiphenylphosphine oxide; 2,4,6-trimethylbenzoylethoxyphenylphosphine oxide; and combinations comprising at least one of the foregoing.

10. The multilayer sheet of claim 1, wherein the first coating layer comprises 30 to 90 weight percent of the urethane acrylate oligomer; 5 to 50 weight percent of the acrylate monomer; and 0 to 10 weight percent of an optional photoinitiator, wherein weight percent is based upon the total weight of the coating composition.

11. The multilayer sheet of claim 1, wherein the urethane acrylate oligomer comprises an aliphatic urethane acrylate oligomer and wherein the acrylate monomer comprises a methacrylate monomer.

12. The multilayer sheet of claim 1, wherein the urethane acrylate of the second coating layer comprises an aliphatic urethane tetraacrylate.

13. An article comprising the multilayer sheet of claim 1.

14. The multilayer sheet of claim 1,
wherein at least one of the first coating layer and the second coating layer comprises an acrylate oligomer and a photoinitiator;
wherein the photoinitiator comprises at least one of hydroxycyclohexylphenyl ketone; hydroxymethylphenylpropanone; dimethoxyphenylacetophenone; 2-methyl-1-[4-(methylthio)phenyl]-2-morpholinopropanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy) phenyl-(2-hydroxy-2-propyl) ketone; diethoxyacetophenone; 2,2-di-sec-butoxyacetophenone; diethoxy-phenyl acetophenone; bis (2,6-dimethoxybenzoyl)-2,4-, 4-trimethylpentylphosphine oxide; 2,4,6-trimethylbenzoyldiphenylphosphine oxide; 2,4,6-trimethylbenzoylethoxyphenylphosphine oxide; and combinations comprising at least of the foregoing; and
wherein the urethane acrylate of the second coating layer comprises an aliphatic urethane tetraacrylate.

15. A method of making the multilayer sheet of claim 1, comprising:
forming a substrate comprising a cap layer, wherein the substrate has a first surface and a second surface;
applying a first coating layer on the first surface; and
applying a second coating layer on the second surface.

16. The method of claim 15, wherein the substrate comprises bisphenol-A polycarbonate, dimethyl bisphenol cyclohexane polycarbonate, and combinations comprising at least one of the foregoing.

17. An article made by the method of claim 16.

18. The method of claim 15, further comprising co-extruding a core layer with the cap layer, wherein the core layer forms the second surface of the substrate, and wherein the second coating layer is applied to the second surface.

* * * * *